Patented Feb. 16, 1954

2,669,535

UNITED STATES PATENT OFFICE 2,669,535

HEAT-SEALED COMPOSITE ARTICLE AND SHIRRED PRODUCT AND METHOD OF MAKING SAME

Marcus O. Orr, Akron, Ohio, assignor to The B. F. Goodrich Company, New York, N. Y., a corporation of New York Application April 5, 1951, Serial No. 219,533

9 Claims. (Cl. 154—124)

This invention relates to a new article of manufacture and a method of making the same, and pertains more specifically to a composite heat-bonded structure including a thermoplastic member of vinyl resin heat-sealed to an elastic rubbery member.

It is an object of this invention to provide a composite article having a thermoplastic member bonded to an elastic vulcanized rubbery member by fusion alone, without the use of any extraneous adhesive agents.

Another object is to provide a shirred article by heat-sealing a layer of thermoplastic vinyl resin composition to an elastic vulcanized rubbery layer while the latter is stretched, then permitting the stretched layer to relax.

Other objects will be apparent from the description which follows:

The above-mentioned objectives are accomplished by the present invention. The embodiments of the invention shown in the appended drawings are intended as illustrations of the nature of the invention and not as limitations upon its scope.

Figure 1:
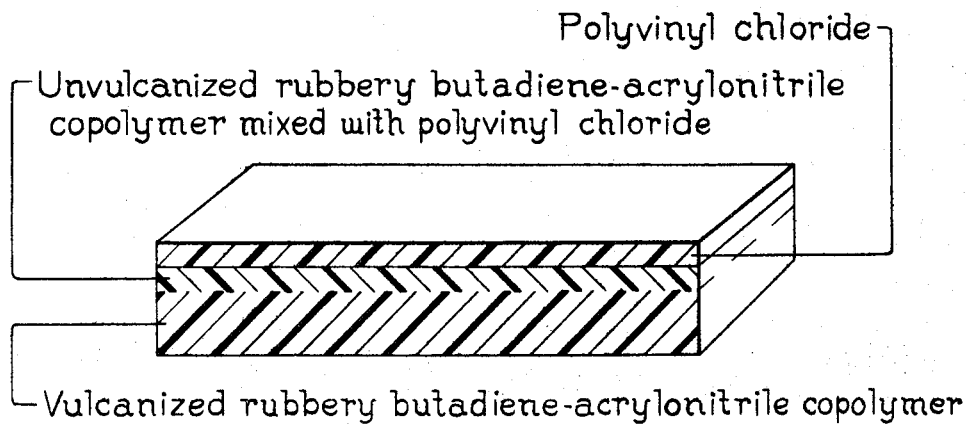
Fig. 1 is a sectional view of one embodiment of this invention.

Conventional elastic vulcanized rubbery compositions are not thermoplastic and are not heat-sealable, either to themselves or to such thermoplastic materials as vinyl resin compositions. However, a composition or film comprising a rubbery polymer of an open-chain conjugated diolefin with an alpha-methylene nitrile which is vulcanized in one stratum and is unvulcanized at least at one face thereof, the unvulcanized stratum comprising, in homogeneous admixture with the rubbery polymer, a polymer comprising predominantly vinyl chloride or vinylidene chloride, possesses the inherent elasticity and strength of other vulcanized rubbery compositions while at the same time being heat-sealable. Such materials are described and claimed in the copending application of Maxey and Krupp, Serial No. 139,517 filed January 19, 1950, now U. S. Patent No. 2,570,829.

As pointed out in that application, the vulcanized portion of the film consists of a rubber composition in which the rubber material comprises essentially a rubbery copolymer of an open-chain conjugated diolefin containing from 4 to 6 carbon atoms with an alpha-methylene nitrile. Among the diolefins which may be used are butadiene-1,3; isoprene; 2,3-dimethyl butadiene-1,3; piperylene; 1,2-dimethyl butadiene-1,3; 1-3 dimethyl butadiene-1,3; 1-ethyl butadiene-1,3; and 1,4-dimethyl butadiene-1,3. Any open chain aliphatic nitrile having an alpha-methylene group may be used, preferably one containing from 3 to 6 carbon atoms such as acrylonitrile, methacrylonitrile and ethacrylonitrile. The rubbery copolymers of these monomeric materials are those containing from 40 to 85% by weight of the diolefin, preferably from 50 to 70% by weight, the balance being acrylic nitrile.

In preparing the film the rubbery copolymer is mixed with a vulcanizing agent such as sulfur and any conventional accelerator of vulcanization in the usual manner. Any of the usual pigments, fillers, reinforcing agents, etc. which are commonly employed may also be present in the composition if desired.

The unvulcanized portion of the film comprises a rubbery copolymer which may be identical with that present in the vulcanized stratum except that it is not vulcanized, together with a bonding agent such as a chloroethylene polymer. Any of the usual pigments, fillers, dyes, reinforcing agents, etc. as are known to the art may also be included if desired.

The chloroethylene polymers which are present in the unvulcanized portion of the membrane include any polymers made by polymerizing a monomeric material comprising predominantly a chloroethylene having from 1 to 2 chlorine atoms present on one only of the carbon atoms, among which are polymers of vinyl chloride or of vinylidene chloride, or copolymers of these materials with each other or with lesser amounts of other copolymerizable materials containing a single ethylenic linkage such as vinyl acetate, styrene, methyl acrylate, methyl methacrylate, ethyl acrylate, vinyl bromide, vinyl cyanide, vinylidene cyanide, and the like. Of these, high molecular weight polyvinyl chloride, polyvinylidene chloride, and copolymers of vinyl chloride with vinylidene chloride are preferred.

It has been found that the unvulcanized rubbery copolymer, when homogeneously mixed with the chloroethylene polymer, serves to plasticize the latter so that no additional plasticizer is necessary. However, any of the usual plasticizers for vinyl resins, of which many are known and widely available, may be added if desired in order to obtain a softer product. Among the plasticizers which have been shown to be particularly satisfactory are liquids such as tricresyl phosphate, dibutyl phthalate, dioctyl phthalate, and dibutyl sebacate.

Although any desired proportions of the unvulcanized rubbery copolymer and of the chloroethylene polymer may be employed in the sealing stratum, it has been found that best results are obtained using from about 10 to 60 parts by weight of the rubbery copolymer for 90 to 40 parts of chloroethylene polymer in a total of 100 parts of polymeric material.

The film is made by mixing the desired rubbery copolymer with vulcanizing agent, accelerator, and any other desired compounding ingredients in the usual manner, as in an internal mixer or on a roll mill. The composition is then formed into a thin sheet or film, as on a calender. A typical example of a suitable composition is as follows:

| | Parts by weight |
|---|---|
| Butadiene-1,3 acrylonitrile copolymer (67:33) | 100 |
| Channel black | 50 |
| Zinc oxide | 5 |
| Age resister (phenyl beta-naphthylamine) | 1.5 |
| Cottonseed fatty acids | 1.5 |
| Accelerator (mercaptobenzothiazole) | 1.5 |
| Sulfur | 2.0 |

The desired chloroethylene polymer composition is then prepared in the usual manner and likewise sheeted out on a calender. A typical example of this composition is as follows:

| | |
|---|---|
| Butadiene-1,3 acrylonitrile copolymer (67:33) | 60.0 |
| High molecular weight polyvinyl chloride | 40.0 |
| Channel black | 50.0 |
| Age resister (phenyl beta naphthylamine) | 1.0 |

The two films or sheets thus formed are brought together in face-to-face relation while still hot as they leave the calenders and are passed between squeeze rolls. This operation suffices to bond the two films together into a single integral film. If desired, the films or sheets to be bonded may be allowed to cool to room temperature before being placed together with equally good results. In this case, however, the full strength of the bond is not developed until after the subsequent heating step required for vulcanization. The bond strength in either case is such that the finished film cannot be separated into its originally distinct components without tearing.

The integral structure is then heated at 300° F. for 30 minutes to vulcanize the stratum containing vulcanizing agent. The resultant structure is shown in Fig. 1.

If desired, the films may be prepared by casting from a solution or dispersion containing the desired components and in some cases it is advantageous to proceed in this manner. The film may also be prepared by extrusion.

The finished film is resilient, elastic, tough and highly tear resistant, resembling a vulcanized rubber film or sheet in its overall properties. The thickness of the film or of the heat-sealable stratum is not critical. Satisfactory film may have a total thickness of 0.005 inch or less, and the film may be 0.015 to 0.020 inch thick or even as much as 0.1 inch thick or thicker. Each heat-sealable stratum of the film is preferably from one-tenth to one-half the thickness of the vulcanized stratum for most satisfactory results.

The materials to which such film may be heat-sealed include thermoplastic compositions comprising a polymer of a monomeric material comprising predominantly a chloroethylene having from one to two chlorine atoms on one only of the carbon atoms, such as polymers of vinyl chloride or of vinylidene chloride, or copolymers of these materials with each other or with lesser amounts of other copolymerizable materials containing a single ethylenic linkage such as vinyl acetate, styrene, methyl acrylate, methyl methacrylate, ethyl acrylate, vinyl bromide, vinyl cyanide, vinylidene cyanide, and the like. Of these, high molecular weight polyvinyl chloride, polyvinylidene chloride, and copolymers of vinyl chloride with vinylidene chloride are preferred. The polymer may be plasticized with any of the usual plasticizers, and the composition may contain any of the conventional compounding ingredients such as pigments, fillers, dyes, stabilizers, etc. The thickness of the thermoplastic film is preferably of the same order of magnitude as that of the elastic film described above.

The composite heat-sealable elastic film may be bonded to the thermoplastic film by any of the usual heat-sealing methods. A hot knife may be employed to heat directly the faces to be joined, or the two members may be positioned in the desired relationship and pressed together between heated bars. If desired, a high-frequency electrostatic field may be employed for heating, using either roller or bar electrodes.

Figure 2:
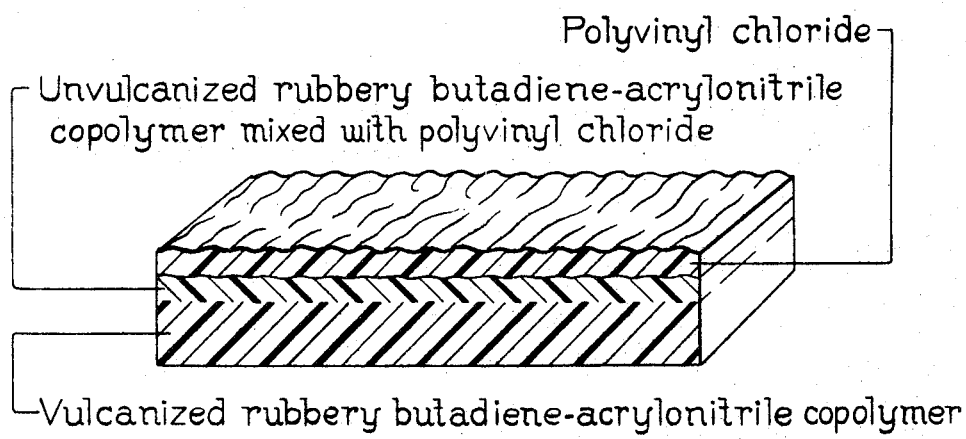
Fig. 2 is a sectional view of another embodiment of this invention.

Because of the inherent permanent elasticity of the composite film or ribbon containing a vulcanized rubbery stratum, it may be heat-sealed while in a stretched condition to a relaxed or unstretched film or sheet of thermoplastic vinyl material. After the two sheets are fused together the tension is relaxed and the resultant contraction produces a shirring of the vinyl sheet, as shown in Fig. 2. The method and product are useful in the manufacture of a variety of articles, such as garments, upholstery, drapery, and any other articles incorporating shirred sheet material.

This result has been difficult of accomplishment with the materials heretofore available, since elastic vulcanized rubbery materials themselves are not heat-sealable, and the conventional thermoplastic materials which are heat-sealable tend to lose their elasticity and acquire a permanent set when heated to the temperature required to heat-seal or fuse them together.

This invention makes possible a composite product combining the elasticity and resiliency of vulcanized rubbery compositions over a wide temperature range with the chemical inertness, water-resistance, and decorative effects of thermoplastic vinyl material in a very simple and inexpensive manner. The necessity for adhesive cements or other bonding agents is eliminated, the elements being united by a simple fusing operation.

Although specific embodiments of the invention have been described herein, it will be understood that all of the obvious variations and modifications are included within the spirit and scope of the appended claims.

I claim:

1. A composite article comprising an elastic member including a rubbery polymer of an open-chain conjugated diolefin with an alpha-methylene nitrile, said polymer being vulcanized in a stratum of said member and being unvulcanized in a stratum at a face of said member, said unvulcanized stratum comprising, in homogeneous admixture with said rubbery polymer, a polymer of a monomeric material comprising predominantly a chloroethylene having from one to two chlorine atoms on one only of the carbon atoms, and a thermoplastic member comprising a polymer of a monomeric material comprising predominantly a chloroethylene having from one to two chlorine atoms on one only of the carbon atoms, said thermoplastic member being fused in direct face-to-face contact to said face of the elastic member.

2. A composite article comprising an elastic member including a rubbery polymer of butadiene-1,3 with acrylonitrile, said polymer being vulcanized in a stratum of said member and being unvulcanized in a stratum at a face of said member, said unvulcanized stratum comprising, in homogeneous admixture with said rubbery polymer, a polymer of a monomeric material comprising predominantly vinyl chloride, and a thermoplastic member comprising a polymer of a monomeric material comprising predominantly vinyl chloride, said thermoplastic member being fused in direct face-to-face contact to said face of the elastic member.

3. A shirred article comprising two relatively thin sheet-like elements fused together in direct face-to-face contact, one of said elements comprising an elastic member including a rubbery polymer of an open-chain conjugated diolefin with an alpha-methylene nitrile, said polymer being vulcanized in a stratum of said member and being unvulcanized in a stratum at a face of said member, said unvulcanized stratum comprising, in homogeneous admixture with said rubbery polymer, a polymer of a monomeric material comprising predominantly a chloroethylene having from one to two chlorine atoms on one only of the carbon atoms, the other of said elements comprising a thermoplastic member comprising a polymer of a monomeric material comprising predominantly a chloroethylene having from one to two chlorine atoms on one only of the carbon atoms, said thermoplastic member being gathered to form shirring while said elastice member is normally substantially smooth.

4. A shirred article comprising two relatively thin normally non-adhesive sheet-like elements fused together in direct face-to-face contact, one of said elements comprising an elastic member including a rubbery polymer of butadiene-1,3 with acrylonitrile, said polymer being vulcanized in a stratum of said member and being unvulcanized in a stratum at a face of said member, said unvulcanized stratum comprising, in homogeneous admixture with said rubbery polymer, a polymer of a monomeric material comprising predominantly vinyl chloride, the other of said elements comprising a thermoplastic member comprising a polymer of a monomeric material comprising predominantly vinyl chloride, said thermoplastic member being gathered to form shirring while said elastic member is normally substantially smooth.

5. A shirred article comprising two relatively thin normally non-adhesive sheet-like elements fused together in direct face-to-face contact, one of said elements comprising an elastic member including a rubbery polymer of butadiene-1,3 with acrylonitrile, said polymer being vulcanized in a stratum of said member and being unvulcanized in a stratum at a face of said member, said unvulcanized stratum comprising, in homogeneous admixture with said rubbery polymer, a polymer of a monomeric material comprising predominantly vinylidene chloride, the other of said elements comprising a thermoplastic member comprising a polymer of a monomeric material comprising predominantly vinylidene chloride, said thermoplastic member being gathered to form shirring while said elastic member is normally substantially smooth.

6. The method which comprises stretching an elastic sheet comprising a rubbery polymer of an open-chain conjugated diolefin with an alpha-methylene nitrile, said polymer being vulcanized in a stratum of said member and being unvulcanized in a stratum at a face of said member, said unvulcanized stratum comprising, in homogeneous admixture with said rubbery polymer, a polymer of a monomeric material comprising predominantly a chloroethylene having from one to two chlorine atoms on one only of the carbon atoms, heat-sealing said face throughout its extent to a face of a thermoplastic sheet comprising a polymer of a monomeric material comprising predominantly a chloroethylene having from one to two chlorine atoms on one only of the carbon atoms, said thermoplastic sheet being in a relaxed substantially unstretched condition, and thereafter relaxing the stretched sheet to produce shirring of said thermoplastic sheet.

7. The method which comprises stretching an elastic sheet comprising a rubbery polymer of butadiene-1,3 with acrylonitrile, said polymer being vulcanized in a stratum of said member and being unvulcanized in a stratum at a face of said member, said unvulcanized stratum comprising, in homogeneous admixture with said rubbery polymer, a polymer of a monomeric material comprising predominantly vinyl chloride, heat-sealing said face throughout its extent to a face of a thermoplastic sheet comprising a polymer of a monmeric material comprising predominantly vinyl chloride, said thermoplastic sheet being in a relaxed substantially unstretched condition, and thereafter relaxing the stretched sheet to produce shirring of said thermoplastic sheet.

8. The method which comprises superposing an elastic sheet and a thermoplastic sheet, said elastic sheet comprising a rubbery polymer of butadiene-1,3 with acrylonitrile, said polymer being vulcanized in a stratum of said sheet and being unvulcanized in a stratum at a face of said sheet, said unvulcanized stratum comprising, in homogeneous admixture with said rubbery polymer, a polymer of vinyl chloride, said thermoplastic sheet comprising a polymer of vinyl chloride, heat-sealing said superposed sheets together throughout their extent while said elastic sheet is stretched substantially more than the other, and thereafter relaxing the stretched sheet to produce shirring of the thermoplastic sheet.

9. The method which comprises superposing an elastic sheet and a thermoplastic sheet, said elastic sheet comprising a rubbery polymer of butadiene-1,3 with acrylonitrile, said polymer being vulcanized in a stratum of said sheet and being unvulcanized in a stratum at a face of said sheet, said unvulcanized stratum comprising, in homogeneous admixture with said rubbery polymer, a polymer of vinylidene chloride, said thermoplastic sheet comprising a polymer of vinylidene chloride, heat-sealing said superposed sheets together throughout their extent while said elastic sheet is stretched substantially more than the other, and thereafter relaxing the stretched sheet to produce shirring of the thermoplastic sheet.

MARCUS O. ORR.

References Cited in the file of this patent

UNITED STATES PATENTS

| Number | Name | Date |
|---|---|---|
| 1,356,783 | Ogilvie | Oct. 26, 1920 |
| 1,811,925 | Garrett | June 30, 1931 |
| 2,022,852 | Galligan et al. | July 1, 1935 |
| 2,041,356 | Kraft | May 19, 1936 |
| 2,075,189 | Galligan et al. | Mar. 30, 1937 |
| 2,115,151 | Stein | Apr. 26, 1938 |
| 2,139,922 | Williams et al. | Dec. 13, 1938 |
| 2,423,294 | Colesworthy | July 1, 1947 |
| 2,429,177 | Young | Oct. 14, 1947 |
| 2,570,829 | Maxey et al. | Oct. 9, 1951 |
| 2,577,476 | Nashley | Dec. 4, 1951 |
| 2,594,229 | Snyder et al. | Apr. 22, 1952 |